United States Patent
Akutsu

[19]

[11] Patent Number: 6,081,187
[45] Date of Patent: Jun. 27, 2000

[54] VEHICLE POSITION DETECTION SYSTEM

[75] Inventor: Eisaku Akutsu, Susono, Japan

[73] Assignee: Toyota Jidosha Kabushiki Kaisha, Aichi-Ken, Japan

[21] Appl. No.: 08/919,109

[22] Filed: Aug. 28, 1997

[30] Foreign Application Priority Data

Aug. 30, 1996 [JP] Japan ................................. 8-229683

[51] Int. Cl.$^7$ .................................................. B60Q 1/00
[52] U.S. Cl. ........................ 340/436; 340/904; 340/435; 340/942; 180/168; 180/169
[58] Field of Search ................... 340/905, 904, 340/903, 901, 942, 435; 250/239, 397; 180/168, 169

[56] References Cited

U.S. PATENT DOCUMENTS

| | | | |
|---|---|---|---|
| 3,921,749 | 11/1975 | Kawada | 340/904 X |
| 4,361,202 | 11/1982 | Minovitch | 180/168 |
| 4,373,161 | 2/1983 | Matsumura | 343/717 |
| 4,530,056 | 7/1985 | MacKinnon et al. | 701/25 |
| 4,695,068 | 9/1987 | Kawamoto et al. | 701/24 |
| 4,847,773 | 7/1989 | van Helsdingen et al. | 701/200 |
| 4,932,617 | 6/1990 | Heddebaut et al. | 246/8 |
| 5,318,143 | 6/1994 | Parker et al. | 180/168 |
| 5,369,591 | 11/1994 | Broxmeyer | 701/301 |
| 5,373,911 | 12/1994 | Yasui | 180/168 |
| 5,481,268 | 1/1996 | Higgins | 342/70 |
| 5,485,378 | 1/1996 | Franke et al. | 701/24 |
| 5,568,137 | 10/1996 | Liu | 340/905 |
| 5,698,259 | 12/1997 | Collinucci | 427/136 |
| 5,708,427 | 1/1998 | Bush | 340/941 |
| 5,774,069 | 6/1998 | Tanaka et al. | 701/24 |

FOREIGN PATENT DOCUMENTS

| | | |
|---|---|---|
| 0 135 740 | 4/1985 | European Pat. Off. . |
| 0 568 067 | 11/1993 | European Pat. Off. . |
| 0568 067 A1 | 11/1993 | European Pat. Off. . |
| 2 736 225 | 1/1997 | France . |
| 1-106910 | 7/1989 | Japan . |
| 2 270 438 | 3/1994 | United Kingdom . |
| WO 96/00910 | 1/1996 | WIPO . |

OTHER PUBLICATIONS

"Combined Longitudinal and Lateral Controller Design for a Vehicle with Radar Sensors", Umit Ozguner et al., The Ohio State University, pp. 51–57 (1995).

French Search Report dated Nov. 28, 1997 (2 pages) Communication (1 page).

Primary Examiner—Daryl Pope
Attorney, Agent, or Firm—Finnegan, Henderson, Farabow, Garrett & Dunner, L.L.P.

[57] ABSTRACT

A system which accurately detects a position of a vehicle on a road regardless of weather is disclosed. Radio wave reflecting bodies are placed on a road, and transmitter-receiver which can transmit and receive radio waves of wavelength is longer than a millimeter are placed on a vehicle. Based on a ratio of reception strength of the transmitter-receiver in the right and left of the vehicle, a displacement of the vehicle relative to the radio wave reflecting body is detected. The radio wave reflecting bodies have apertures or notches in a predetermined interval so that the radio wave signals reflected thereby has periodicity, and can be distinguished from other objects on the road.

8 Claims, 10 Drawing Sheets

VEHICLE POSITION DETECTION SYSTEM

BACKGROUND OF THE INVENTION

1. Field of the Invention

The present invention relates to a vehicle position detection system and, more specifically, to a detection system employing radio waves.

2. Description of the Related Art

Methods for detecting a relative position of a vehicle to a road, which is for automatic driving of a vehicle, are known.

For example, in Japanese Utility Model Laid-Open Publication No. Hei1-106910, a method for detecting a vehicle attitude using paving light reflecting tape installed on a road and a pair of photo sensors installed on a vehicle with a width less than that of the light reflecting tape has been disclosed. Another method of detecting the position of a vehicle relative to white lines by recording a road surface using an in-vehicle camera and extracting the white lines in a screen is also known.

However, if a light reflecting tape is used, sufficient reflection may not be obtained in some cases due to dirt on the tape as, unlike in indoor test situations, actual road surfaces are always affected by rain, snow, or the like. Especially, in the case of rain, puddles of water reflect light very well, which is problematic for high accuracy vehicle position detection. Even when in-vehicle cameras tend to be affected by the weather. Under rainy conditions, there is insufficient contrast between the white lines and other areas of the road surface, and the white lines can not be extracted with high accuracy.

SUMMARY OF THE INVENTION

An object of the present invention is to detect a vehicle position relative to a road surface with high accuracy, and without being affected by the weather conditions such as rain.

To achieve the above-described object, a vehicle position detection system of the present invention comprises a radio wave reflecting means placed on a road surface, an in-vehicle transmission means for transmitting to the road surface radio waves whose wavelength is greater than a millimeter, an in-vehicle reception means for receiving the radio waves transmitted from the in-vehicle transmission means and reflected by the radio wave reflecting means, and an in-vehicle detection means for detecting a position of the vehicle relative to the radio wave reflecting means based on strength of the radio wave received by the in-vehicle reception means. By using radio waves with wavelength greater than millimeter rather than light waves as conventionally have been used, a vehicle position can be accurately detected, without being affected by rain or snow. It is also advantageous that this system tends not to be affected by other environmental conditions, since the detection is performed in an active manner by transmitting radio waves from a vehicle and receiving the reflection thereof.

Preferably, a plurality of pairs of the in-vehicle transmission and reception means are placed in a transverse direction of the vehicle, that is, in right and left direction of the vehicle, and transmit and receive in turns.

Also preferably, a plurality of beams from or to at least either the in-vehicle transmission means or the reception means are emitted in the transverse direction of the vehicle, that is, on right and left direction of the vehicle, and transmit and receive in turns.

Also preferably, the in-vehicle transmission means transmits in a predetermined discontinuous pattern which is based on random number, for example. If other vehicles exist adjacently, transmission in a same continuous pattern can cause interference. Therefore, interference can be avoided by that one vehicle transmits radio waves in a predetermined discontinuous pattern (characteristic to the vehicle) which is different from the other vehicles' pattern.

Also preferably, the in-vehicle transmission means transmits a plurality of radio waves whose frequencies are different. If transmission and reception are carried out in one frequency, interference between the waves transmitted and being received depending on a distance between the radio wave reflecting means and the in-vehicle transmission and reception means may cause remarkable reduction in strength of the radio wave, even when there is no reflection from the radio wave reflecting means. By using a plurality of frequencies, interference effects can be avoided, and the strength of the radio wave according to presence or absence of the radio wave reflecting means can be detected with certainty.

On the other hand, for the shape of the radio wave reflecting means, a shape whose radio wave reflecting characteristic changes discontinuously is preferable. For example, the shape has periodic apertures or notches, or has a non metallic material buried periodically. If the radio wave reflecting characteristic is even and simple (for example, has a constant continuous reflection strength), the radio wave reflecting means are not distinguishable from metallic objects, such as those accidently dropped from vehicles, in the road due to similar radio wave reflecting characteristics of the both, and a vehicle position can not be detected accurately. By discontinuously changing the radio wave reflecting characteristic of the radio wave reflecting means, effects noise from objects in the road can be removed.

Moreover, to achieve the object described above, the vehicle position detection system of the present invention comprises metal plates placed on a road surface, an in-vehicle transmitter for transmitting radio waves whose wavelength is more than a millimeter to the road surface, an in-vehicle receiver for receiving the radio waves transmitted from the in-vehicle transmitter and reflected by the metal plates, and a processor which calculates a position of the vehicle relative to the metal plates based on strength of the radio wave received by the in-vehicle receiver.

Preferably, a plurality of at least either the in-vehicle transmitters or the in-vehicle receivers are placed in the transverse direction of the vehicle, and the processor calculates the relative position based on a ratio of radio wave strength in the transverse direction of the vehicle.

DESCRIPTION OF THE PREFERRED EMBODIMENTS

First Embodiment

Figure 1:
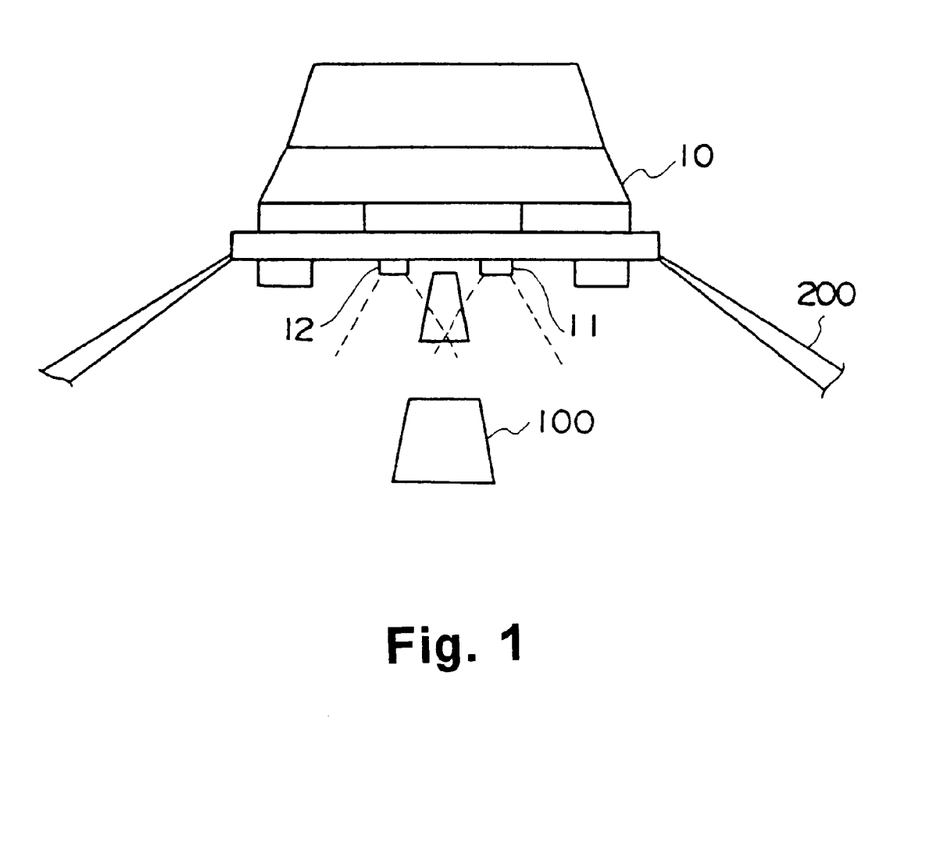
FIG. 1 shows a schematic configuration of an embodiment of the present invention.

FIG. 1 shows a schematic configuration of an embodiment related to the present invention. Beneath a vehicle 10, transmitter-receiver 11 and 12 are placed in a transverse direction of the vehicle, that is, in right and left. The transmitter-receiver 11 and 12 transmit radio waves whose wavelength is longer than a millimeter. On a road surface, radio wave reflecting bodies 100 are placed almost at the center of a lane, and reflect radio waves transmitted from the vehicle 10. As radio wave reflecting bodies, plates made of metal such as iron, brass, or aluminum can be used. In FIG. 1, a rectangular metal plate (for example, 20 cm wide, and 60 cm long) is used as the radio wave reflecting body unit and a plurality of these plates are placed in a predetermined interval in a longitudinal direction of the vehicle. Alternatively, the radio wave reflecting bodies 100 may be composed of a paint into which granular metallic pieces have been mixed. The reflected radio waves from the radio wave reflecting bodies 100 are received by the transmitter-receiver 11 and 12, and the strength of the reflection is detected thereby. If the radio wave reflecting bodies 100 exist in a range which the transmitted radio wave reaches, the refection is strengthened; otherwise it is reduced. Index 200 refers to a white line on the lane. By using radio waves whose wavelength is longer than a millimeter, water effects can be suppressed as compared to a case using lightwaves. In other words, if there exists a puddle at a place other than the radio wave reflecting bodies 100, the radio wave reflection from the puddle is weaker than the light reflected from the puddle. Therefore, puddles will not be mistaken as radio wave reflecting bodies.

Figure 2:
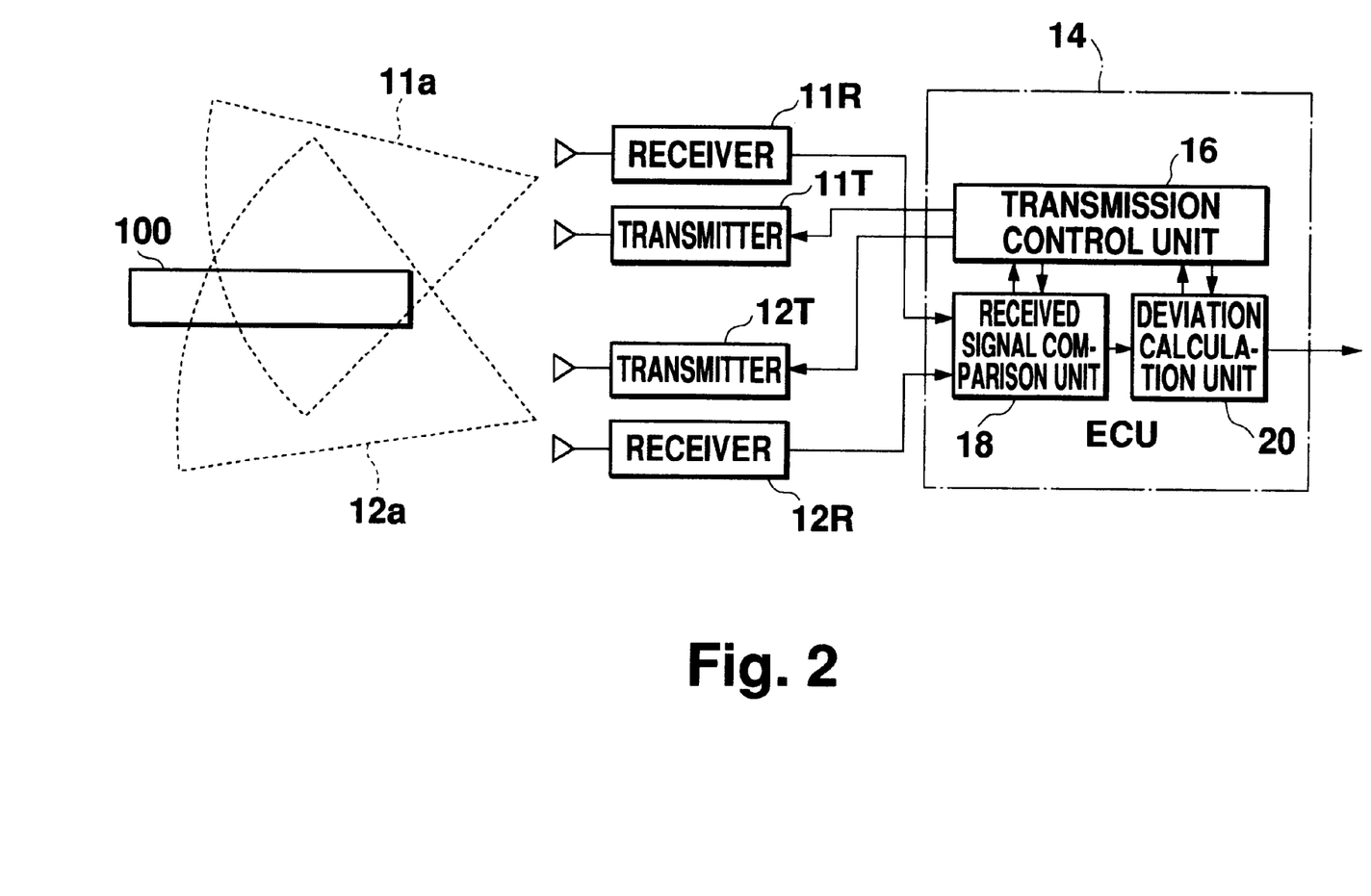
FIG. 2 is a block diagram showing a configuration of the embodiment of the present invention.

FIG. 2 is a block diagram to show a configuration of the present embodiment on the vehicle. The transmitter-receiver 11 is shown as a transmitter 11T and a receiver 11R, while the transmitter-receiver 12 is shown as a transmitter 12T and a receiver 12R. 11a is an area where a beam can reach from the transmitter 11T and to the receiver 11R (beam area) and is an area including the vehicle center and shifted toward right. 12a is area where a beam can reach from the transmitter 12T and to the receiver 12R, which is an area including the vehicle center and shifted toward left. Both beam areas overlap at the center. When the vehicle 10 is running at the center of the lane on which the radio wave reflecting bodies 100 are placed, the radio wave reflecting bodies 100 exist in the overlap area, and reflected radio waves can be received by both right and left receivers. Therefore, in this case, the strength of the received radio waves is almost equal at the receivers 11R and 12R in the right and left. On the other hand, if the vehicle is running with deviation to the right of the lane center, the radio wave reflecting bodies 100 are out of the right beam area 11a, but included in the left beam area. Therefore, the reflected radio waves are weaker at the right receiver than at the left receiver. If the vehicle is running with deviation to the left of the lane center, the radio wave reflecting bodies 100 are out of the left beam area 12a, but included in the right beam area. Therefore, the reflected radio waves are weaker at the left receiver than at the right receiver. As a consequence, a relative position of the vehicle, more precisely, a relative position of the vehicle to the radio wave reflecting bodies can be detected by comparing strength of the reflected radio waves at the right and left receivers. The following is a summary of the above:

(1) If the right reception strength$\geq$the left reception strength, the vehicle is being displaced toward the left of the radio wave reflecting bodies 100 at the lane center.

(2) If the right reception strength$\leq$the left reception strength, the vehicle is being displaced toward the right of the radio wave reflecting bodies 100 at the lane center.

(3) If the right reception strength=the left reception strength, the vehicle is running directly above the radio wave reflecting bodies 100 at the lane center, and no displacement is observed.

More specifically, received signals from the receivers 11R and 12R in the right and left are supplied to a received signal comparison unit 18 in an ECU (Electronic Control Unit) 14 where a ratio of the received signal strength from both receivers (for example, signals from the right receiver 11R are used as a reference) is calculated. The ratio is supplied to a deviation calculation unit 20 where a deviation is calculated based on the received ratio and supplied to an ECU for steering control. According to the definition of the ratio described above, the deviation is 0 when the ratio is almost 1. If the ratio is smaller than 1, it is judged as a leftward deviation (toward the left of the radio wave reflecting bodies 100), while if the ratio is larger than 1, it is judged as a rightward deviation (toward the right of the radio wave reflecting bodies 100). As a deviation judgment method, storing in a memory a map or a table which shows a pre-calculated relationship between the ratio and deviation and reading a deviation corresponding to be obtained ratio from the map or table can be sufficient. Alternatively, a relationship between the ratio and the deviation can be stored in the memory as a function. A transmission control unit 16 controls a transmission timing from both the right and left transmitters and drives both transmitters in turns so that no interference occurs between the radio waves from the transmitters. However, it is necessary to set a driving frequency of the transmitters sufficiently fast relative to the vehicle speed because, if a large time difference exists between measurements of the received radio wave strength by the right and left transmitter-receiver, it is possible that these values should be considered to be measurements at different positions, depending on vehicle speed.

By setting transmitter-receiver in right and left and comparing received radio wave strength thereby, it is easily detected in which direction (right or left) and by how much the vehicle is displaced, relative to the radio wave reflecting bodies 100. By comparing the received radio wave strength between right and left, a relative position of the vehicle can be accurately detected, without being affected by a change in received radio wave strength due to a change in vehicle clearance. Because a change in vehicle clearance has equal effect on received radio wave strength to the right and to the left, such a chance will not effect the ratio thereof.

If a road surface is flat and the vehicle height stays almost constant, it is possible to use only one transmitter-receiver. However, in that case, only the magnitude of the deviation in vehicle position relative to the radio wave reflecting bodies 100 is detected by a change in the strength of the received radio waves, and the direction of displacement is not detected. Therefore, it will be preferable to detect displacement direction by a combination with, for example, a steering angle sensor. More specifically, if the received radio wave strength is reduced from its peak level and steering toward left has been carried out, it is judged that the vehicle is being displaced towards left the relative to the radio wave reflecting bodies.

Figure 3A:
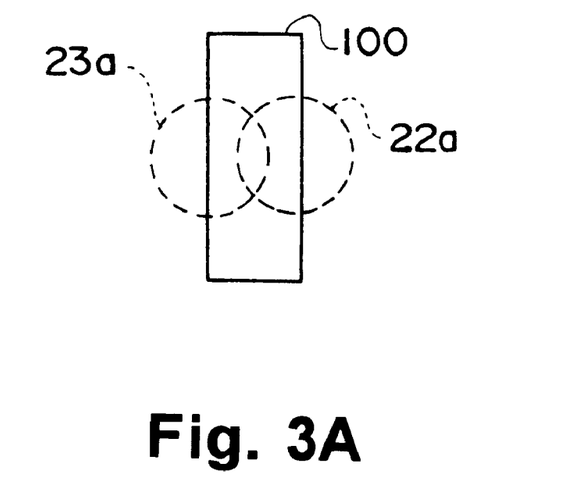
FIG. 3A is an explanatory view showing a range of the beam transmitted.
Figure 3B:
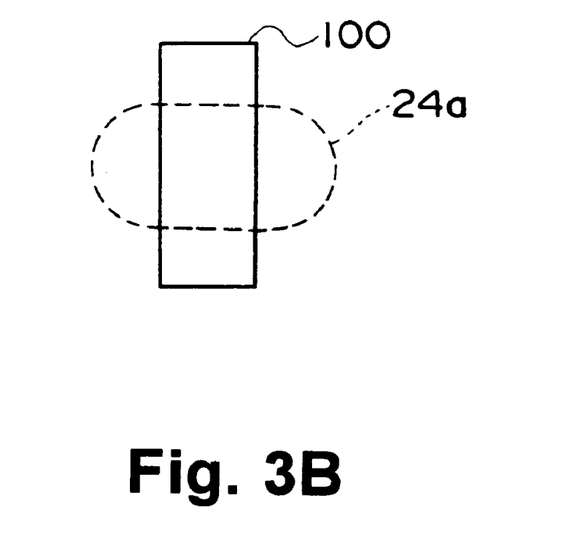
FIG. 3B is an explanatory view showing a range of the beam to be received.
Figure 4A:
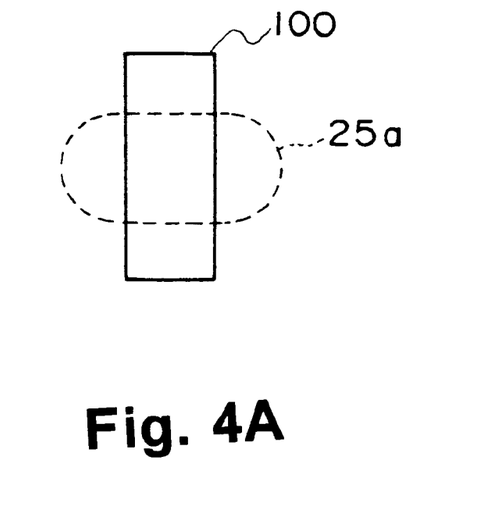
FIG. 4A is an explanatory view showing another range of the beam transmitted.
Figure 4B:
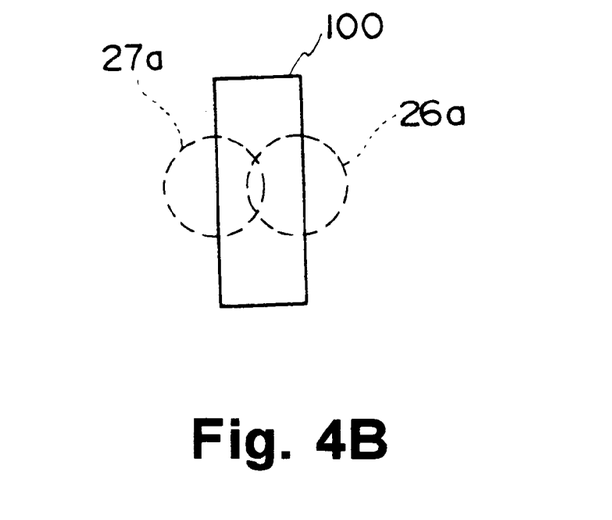
FIG. 4B is an explanatory view showing another range of the beam to be received.

Alternatively, by setting one transmitter-receiver and a plurality of beams transmitted or to be received, the same functionality as in the embodiment illustrated in FIGS. 1 and 2 can be obtained. For example, as shown by FIG. 3A, a single transmitter transmits a beam 22a shifted toward the right of the vehicle center and receives a new reflection at one instant, and at a next point the same transmitter transmits a beam 23a shifted toward the left of the vehicle center and receives its reflection. In this case, only one single beam to be received is sufficient, as shown by beam 24a in FIG. 3B. Alternatively, as shown by FIG. 4A, it is possible that a wide beam 25a, which includes not only the vehicle center but also the right and left thereof, is used upon transmission, while upon reception, as shown by FIG. 4B, a beam 26a which has rightward directivity is used at one point and a beam 27a which has leftward directivity is used at another point. For example, an active antenna which can vary its directivity may be used to implement a plurality of beams.

Figure 5A:
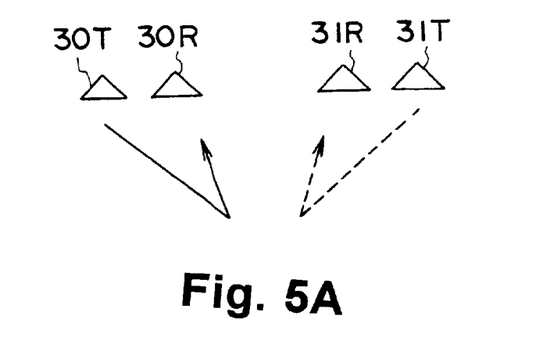
FIG. 5A is an explanatory view showing a process in the case of two transmitters and two receivers.
Figure 5B:
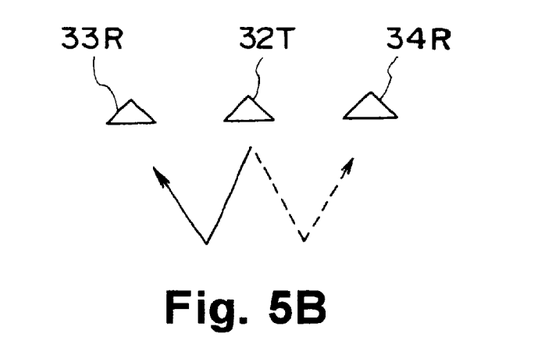
FIG. 5B is an explanatory view showing a process in the case of one transmitter and two receivers.

Moreover, in a case where a plurality of transmitter-receiver are used, not only the combination of two transmitters and two receivers as shown in FIG. 2, but also a variety of other combinations are possible. FIGS. 5A–5E show some examples of the combination. In FIG. 5A, two transmitters 30T and 31T and two receivers 30R and 31R are used as in FIG. 2, and a radio wave whose wavelength is longer than one millimeter is transmitted from the transmitter 30T in one instance and received by the receiver 30R, and at another point is transmitted from the transmitter 31T and received by the receiver 31R. If FIG. 5B, a combination of a transmitter 32T and two receivers 33R and 34R is used, and the radio wave is transmitted from the transmitter 32T and received by the receiver 33R at one point, and transmitted from the transmitter 32T and received by the receiver 34R at another point.

Figure 5C:
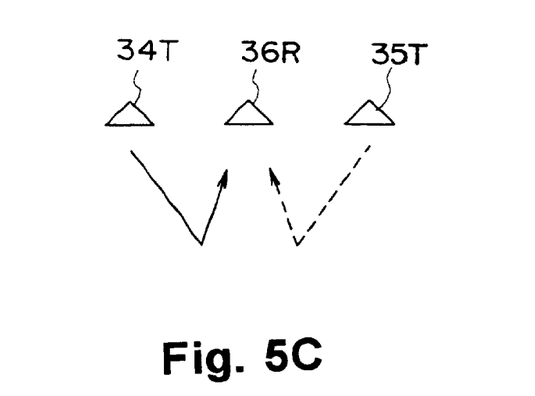
FIG. 5C is an explanatory view showing a process in the case of two transmitters and one receiver.

In FIG. 5C, a combination of two transmitters 34T and 35T and a receiver 36R is used, and the radio wave is transmitted from the transmitter 34T and received by the receiver 36R at one instant, and transmitted from the transmitter 35T and received by the receiver 36R at another point.

Figure 5D:
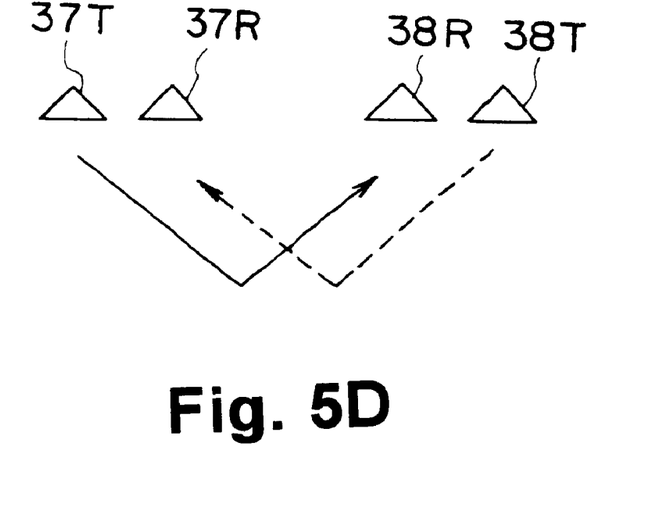
FIG. 5D is an explanatory view showing another process in the case of two transmitters and two receivers.
Figure 5E:
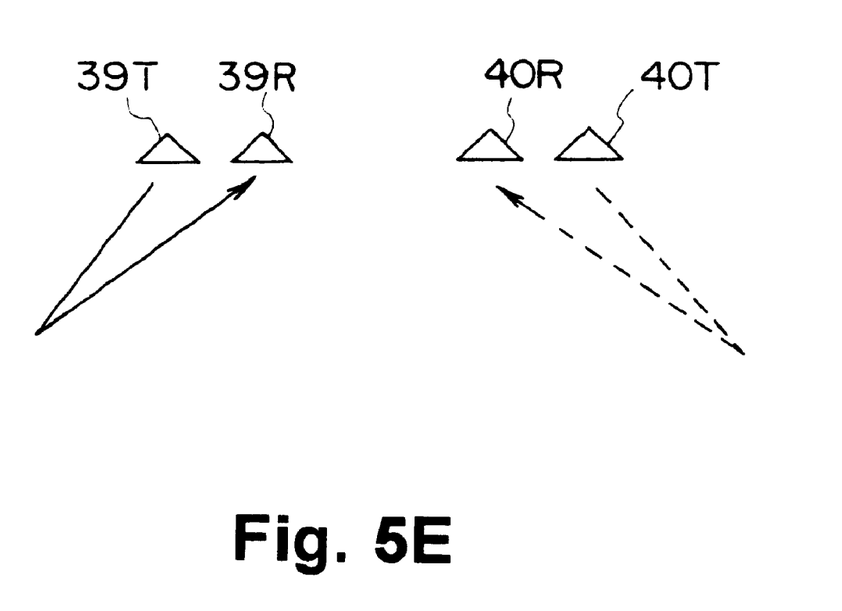
FIG. 5E is an explanatory view showing still another process in the case of two transmitters and two receivers.

In FIG. 5D, a combination of two transmitters and two receivers is used, as in FIG. 5A, and the radio wave is at one point transmitted from the transmitter 37T and received by the receiver 38R placed on the opposite side of the transmitter 37T, and at another time transmitted from the transmitter 38T and received by the receiver 37R placed on the opposite side of the transmitter 38T. In FIG. 5E, a combination of two transmitters and two receivers is also used. However, a case is considered here where the light reflecting bodies are placed not on the lane center, but along a white line near the edge of the lane. A radio wave transmitted from a transmitter 39T toward the outside of the vehicle is received by a receiver 39R, while a radio wave transmitted from a transmitter 40T is received by a receiver 40R. In this case interference of the radio waves is almost impossible, and simultaneous transmission or reception by the right and left transmitter-receiver is possible.

As described above, by shifting timing of transmission and reception by the right and left transmitter-receiver, transmitter-receiver can be shared and the number of parts can be reduced.

Second Embodiment

In the first embodiment described above, radio waves whose wavelength is longer than one millimeter is transmitted from the transmitter. However, depending on the radio wavelength to be used, a stationary wave exists between a road surface and a transmitter-receiver, and strength of a reflected wave may be weakened, even in a place where radio wave reflecting bodies 100 exist.

Figure 6:
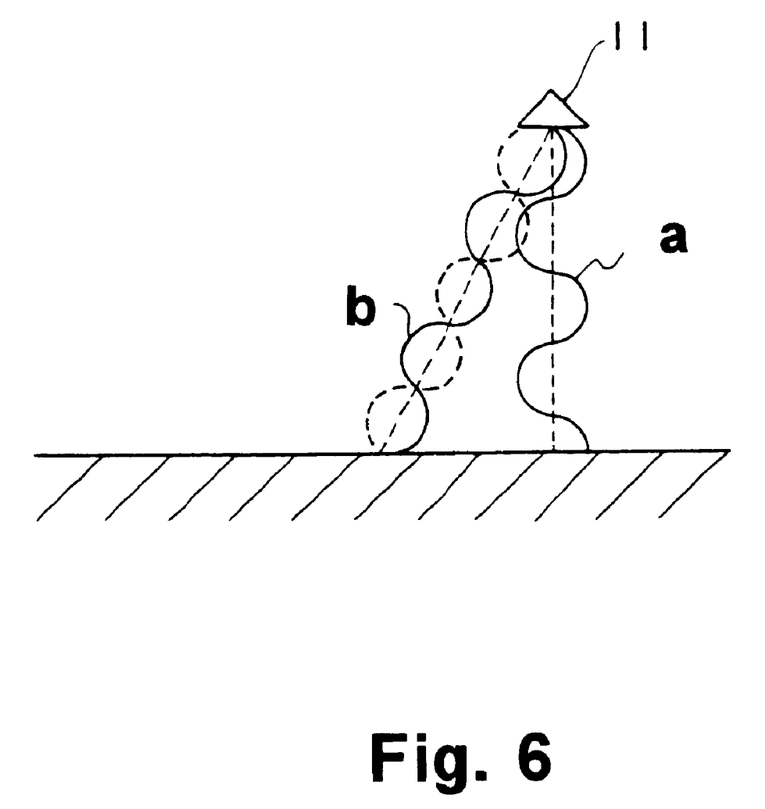
FIG. 6 is an explanatory view showing a reflection strength change in the case of radio waves transmitted beneath and diagonally.

In FIG. 6, a radio wave transmitted downward from the transmitter-receiver 11 is shown by a and the strength of its reflection basically changes depending on presence or absence of the radio wave reflecting bodies 100. On the other hand, a radio wave transmitted diagonally downward from the transmitter is shown by b. If a multiple of the half wavelength of the radio wave is equal to the distance between the transmitter-receiver and the road surface, the reflected wave and the transmitted wave sometimes interfere with each other and become weaker. As a consequence, the strength of the reflected wave is greatly reduced, even when the radio wave reflecting bodies 100 are present. Therefore, in a case where a vehicle position is detected using a radio wave in a single wavelength by a change in the strength of the wave reflected, the position may not be detected accurately using the wavelength. In the present embodiment, instead of using a radio wave in a single wavelength, radio waves in a plurality of different wavelengths, that is, a plurality of radio waves in different frequencies are transmitted, and by selecting the radio waves by their wavelength so that meaningful reflection strength can be obtained, a vehicle position can be accurately detected.

A basic configuration of the present embodiment is the same as the configuration shown in FIG. 2. However, transmitters 11T and 12T transmit radio waves with different wavelengths. Wavelengths along the lines of 30, 32, or 34 cm or the like may be used if a vehicle height of several tens of centimeters is to be considered. The received signal comparison unit 18 monitors the reflection strength of the radio waves in those wavelength, and the vehicle position is detected using signals with sufficient reflection. For example, if the strength of a 30 cm radio wave is near 0, while the strength of a 34 cm radio wave is large, the vehicle position is detected using the 34 cm wave.

In this manner, a vehicle position can be accurately detected without being affected by the interference between the transmitted radio waves and the received radio waves. Usually, use of two radio waves with different frequencies is sufficient. However, by using three or more radio waves, great variations in vehicle clearance can be accounted for. The radio waves of different frequencies can be sent simultaneously, or by time division. If they are transmitted by time division, there are various patterns of transmission. One pattern is to transmit in time division the radio waves in all frequencies to be used by the right transmitter-receiver and then to continue on to processing by the left transmitter-receiver. Another method is to perform processing of the radio waves in each frequency alternately by the right and left transmitter-receivers. Either method may be adaptabed.

Third Embodiment

In the first embodiment described above, position detection of a sole vehicle is considered. In a case where a plurality of vehicles are running adjacently, it is possible for one of the vehicles running adjacently to receive radio waves transmitted from the other vehicle. Therefore, in the present embodiment, each vehicle transmits radio waves in a predetermined pattern so that interference between the vehicles can be avoided.

Figure 7:
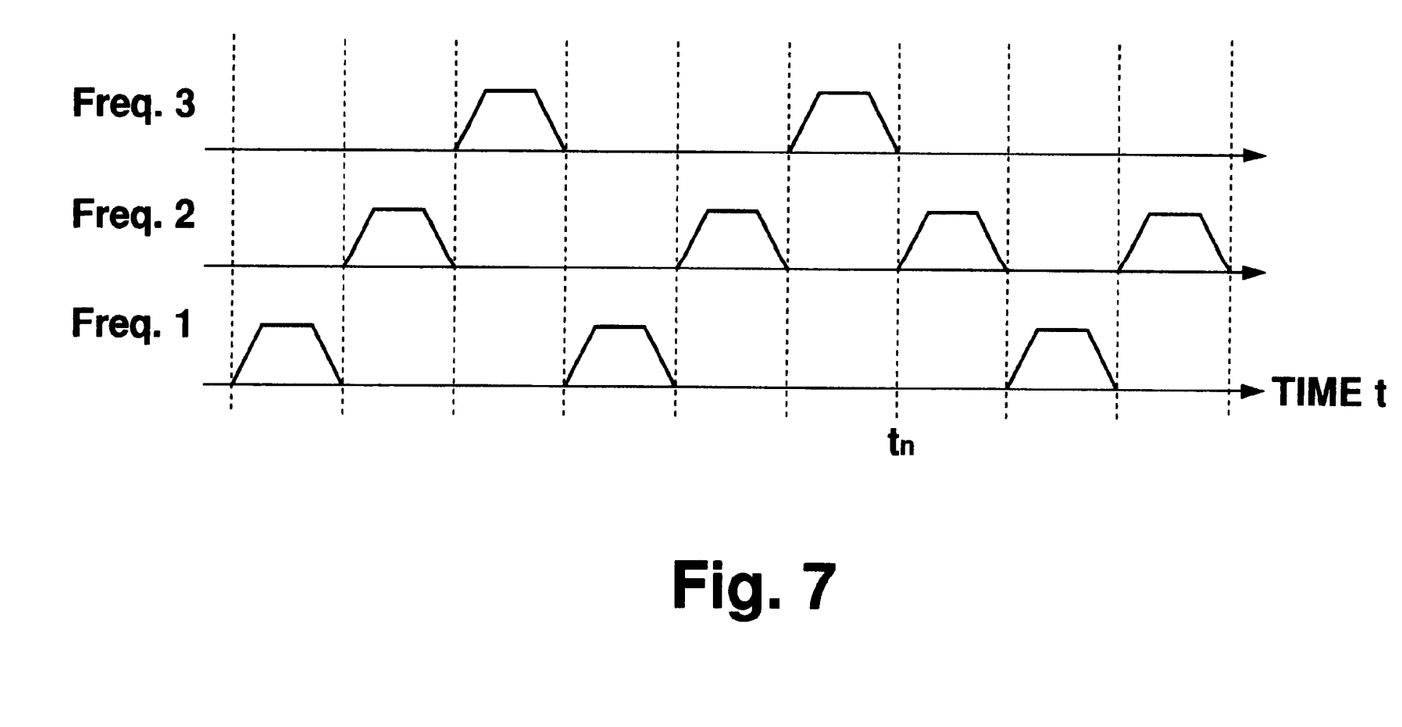
FIG. 7 is a timing chart for a case of transmitting a plurality of radio waves in different frequencies according to a predetermined pattern.

The block diagram to show the configuration of each vehicle system is the same as shown by FIG. 2. The transmission patterns controlled by the transmission control unit 16 of each vehicle are different from each other. In FIG. 7, a timing chart of a transmission pattern by one vehicle is shown. A plurality of radio waves in different frequency are used as transmitting radio waves, and transmitted in time division. Until time $t_n$, radio waves in a first, a second, and a third frequencies are transmitted sequentially in this order. After the time $t_n$, the radio waves in the first and the second frequencies are transmitted alternately. The transmission pattern characteristic to the vehicle is defined by repeating this transmission pattern as a basic cycle. On the other hand, if the transmission pattern of an adjacent vehicle is a pattern in which three frequencies are sequentially switched, signal components in synchronization with the transmission pattern as shown in FIG. 7 become the signal components of the radio waves transmitted from the transmitter of the vehicle and reflected by the radio wave reflecting bodies. Therefore, the radio waves can be easily distinguished from radio waves transmitted from other vehicles.

By transmitting radio waves in a specific pattern as described above, not only can interference between vehicles be effectively avoided, but so can interference from a source other than a vehicle reflected by the radio wave reflecting bodies.

Figure 8A:
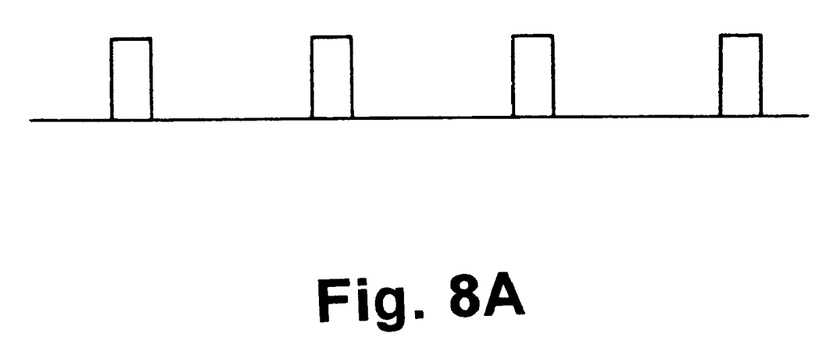
FIG. 8A is a timing chart for a case of transmitting a radio wave in one frequency according to a predetermined pattern.
Figure 8B:
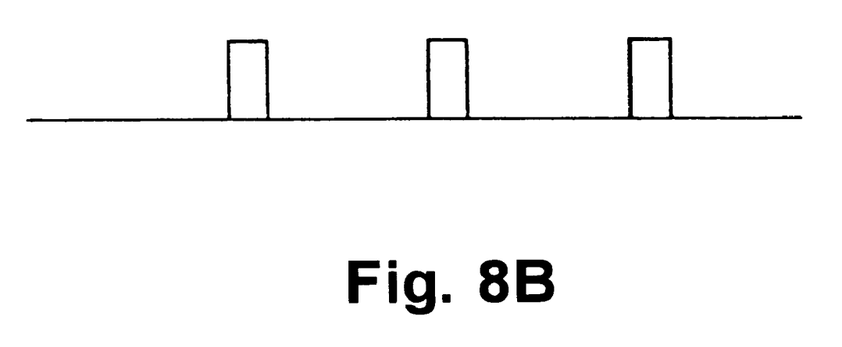
FIG. 8B is a timing chart for a case of transmitting a radio wave in one frequency according to a pattern different from the pattern in FIG. 8A.

In the method shown in FIG. 7, radio waves with different frequencies are used. However, a radio wave in one frequency can also be used. In FIGS. 8A and 8B, an example of a transmission pattern from a vehicle using one frequency (FIG. 8A) and a transmission pattern of another vehicle adjacent to the aforesaid vehicle (FIG. 8B) is shown. By shifting transmission timings so that transmissions are do not simultaneous, interference between the vehicles can be avoided even when a single frequency is used. However, it is difficult for this even-frequency transmission pattern to securely avoid interference when a large number of vehicles are running is proximity, and a problem of synchronization between vehicles will also emerge. When the existence of regular radio wave sources other than the transmitters is taken into consideration, it is generally preferable for each vehicle to use a more complex transmission pattern. Specifically, one method is for the transmission control unit 16 to generate a random number and to determing a transmission pattern based on the random number. However, the upper limit of a transmission pulse interval is restricted by vehicle speed because if the interval is too long compared to the vehicle speed, steering control accuracy based on the position displacement detection will be reduced.

In the explanation above, the transmission pattern was explained. However, reception patterns should also be decided so that they are discontinuous and in synchronization with the transmission pattern.

Fourth Embodiment

In the first embodiment, a rectangular metallic plate was used as a unit of the radio wave reflecting bodies. However, if a metallic object of similar size is present on a road, this object is not distinguishable from the radio wave reflecting bodies in terms of reflected radio wave strength, and may cause difficulty in detecting an accurate vehicle position. Therefore, in the present embodiment, a method to obviously distinguish an object in the road from the radio wave reflecting bodies is explained.

Figure 9A:
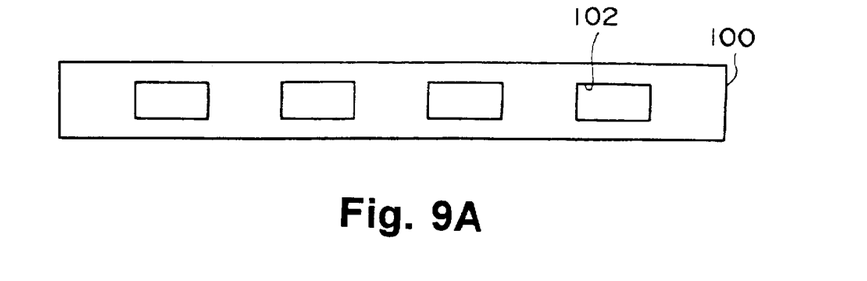
FIG. 9A is a plain view of a radio wave reflecting body with apertures.
Figure 9B:
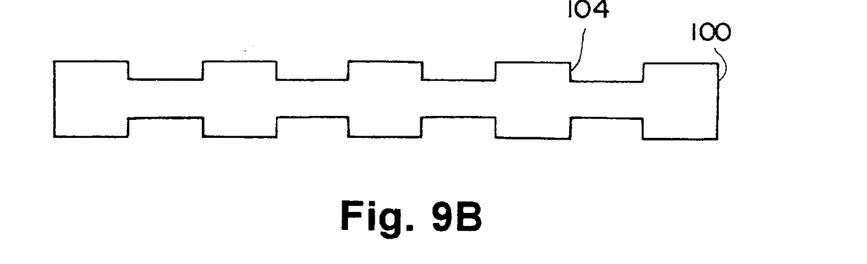
FIG. 9B is a plain view of a radio wave reflecting body with notches.
Figure 9C:
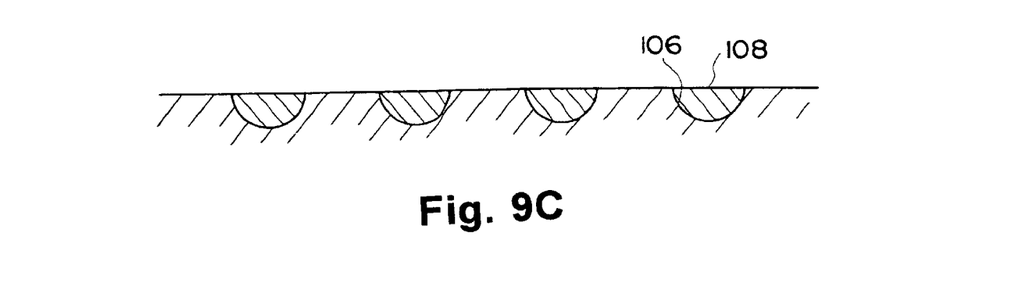
FIG. 9C is a cross sectional view of a radio wave reflecting body composed of a nonmetallic material.
Figure 9D:
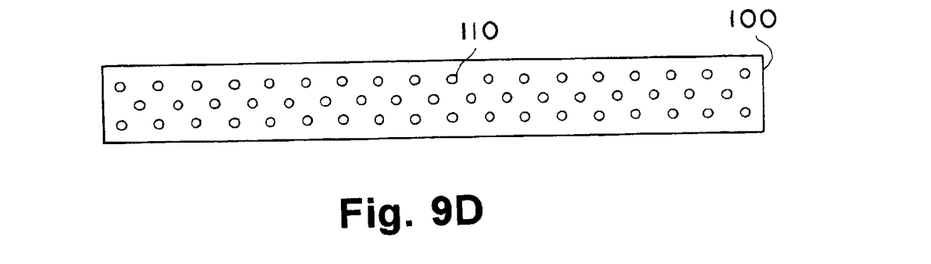
FIG. 9D is a plain view of a radio wave reflecting body with microapertures.
Figure 9E:
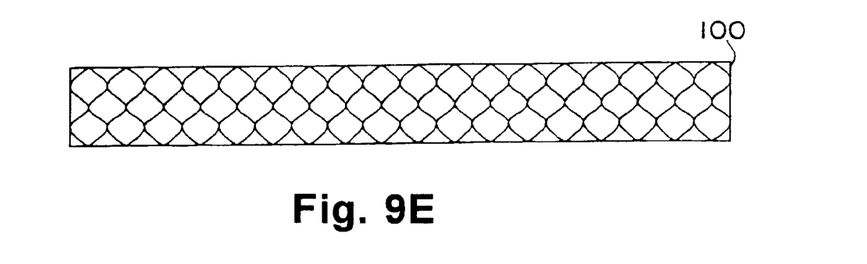
FIG. 9E is a plain view of a radio wave reflecting body composed with an expanded metal.

In FIGS. 9A–9E, various shapes of radio wave reflecting bodies are shown. FIG. 9A shows an example of a radio wave reflecting body as in the first embodiment, with the exception of rectangular apertures 102 included in a predetermined interval (for example, 1 m). When a radio wave reflected by this radio wave reflecting body is received, signals periodically change strength according to the aperture interval and vehicle speed, and this pattern makes these signals easily distinguishable from signals reflected by other objects in a road. FIG. 9B shows an example of a radio wave reflecting body as in the first embodiment, but having periodic notches 104. Since the reflection strength is reduced periodically by the notches, the radio wave reflecting bodies can be distinguished from other objects on a road, as was the case for the body shown in FIG. 9A. FIG. 9C shows a cross section of another radio wave reflecting body, which is composed by burying metallic plates in a road surface and filling periodic concave parts (pits) 106 in the metallic plates with asphalt 108. In this example, the reception strength of the reflected radio wave is also reduced periodically at the asphalt part 108, and the radio wave reflecting bodies can be distinguished from other objects on a road. In FIG. 9D, a plurality of minor water drainage apertures 110 are formed in the radio wave reflecting body in the first embodiment. This radio wave reflecting body is preferable for avoiding water effects with surity. It is also possible to form these minor apertures 110 in FIG. 9D on the radio wave reflecting bodies in FIGS. 9A–9C. On the other hand, FIG. 9E shows a state of a thin metallic plate being extended at a plurality of alternating rents (expanded metal), and this metallic plate is a radio wave reflecting body with regular concave and convex formed on its surface. By using metallic plates such as this as radio wave reflecting bodies, unlike flat metallic plates, it is possible for an incident radio wave coming diagonally to be reflected in the incident direction. Therefore, metallic plates such as this can be placed, not only at a lane center, but also at other parts such as the edge of the lane, which leads to increased degree of freedom in radio wave reflecting body placing parts.

As described above, the radio wave reflecting body is distinguished from other objects in the road by having a characteristic shape so that the radio wave reflecting characteristic becomes discontinuous. The essence is a discontinuous change in the radio wave reflecting characteristic, and any characteristic change, not limited to periodic changes, will be sufficient.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A system for detecting position of a vehicle relative to a lane on a road surface, the system comprising:

transmission means for transmitting to a road surface a radio wave with a wavelength longer than one millimeter;

reception means for receiving the radio wave transmitted from the transmission means and reflected by radio wave reflecting means installed on a single path substantially centered in the lane, wherein the transmission means and the reception means are installed on the vehicle in transmission/reception pairs located transversely on right and left sides of the vehicle; and detection means for detecting a position of the vehicle relative to the radio wave reflecting means based on a ratio of reception strength of the radio wave received by the reception means on right and left sides of the vehicle, wherein the pairs of the transmission means and the reception means transmit and receive in an alternating manner.

2. The system according to claim 1 in which the transmission means transmit in a predetermined discontinuous pattern.

3. The system according to claim 2 in which the predetermined discontinuous pattern is based on random numbers.

4. The system according to claim 1 in which the transmission means transmit a plurality of radio waves of different frequencies.

5. A system for detecting position of a vehicle relative to a lane on a road surface, the system comprising:

transmission means for transmitting to a road surface a radio wave with a wavelength longer than one millimeter;

reception means for receiving the radio wave transmitted from the transmission means and reflected by radio wave reflecting means installed on a single path substantially centered in the lane, wherein a plurality of beams from or to at least either the transmission means or the reception means exist in the transverse direction of the vehicle; and detection means for detecting a position of the vehicle relative to the radio wave reflecting means based on a ratio of reception strength of the radio wave received by the reception means on right and left sides of the vehicle, wherein the transmission or reception of the plurality of beams is executed in an alternating pattern.

6. The system according to claim 5 in which the transmission means transmit in a predetermined discontinuous pattern.

7. The system according to claim 6 in which the predetermined discontinuous pattern is based on random numbers.

8. The system according to claim 5 in which the transmission means transmit a plurality of radio waves of different frequencies.

* * * * *